(12) United States Patent
Oda et al.

(10) Patent No.: US 7,921,650 B2
(45) Date of Patent: Apr. 12, 2011

(54) FUEL SPRAYING APPARATUS OF GAS TURBINE ENGINE

(75) Inventors: Takeo Oda, Kobe (JP); Hiroyuki Ninomiya, Akashi (JP); Hideki Ogata, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 953 days.

(21) Appl. No.: 11/637,060

(22) Filed: Dec. 12, 2006

(65) Prior Publication Data

US 2007/0289305 A1 Dec. 20, 2007

(30) Foreign Application Priority Data

Dec. 13, 2005 (JP) .................... 2005-358357

(51) Int. Cl.
*F02C 1/00* (2006.01)
*F02G 3/00* (2006.01)
(52) U.S. Cl. .............. 60/748; 60/737; 60/740; 60/742
(58) Field of Classification Search ............ 60/737, 60/740, 742, 748
See application file for complete search history.

(56) References Cited

U.S. PATENT DOCUMENTS

| | | | |
|---|---|---|---|
| 3,853,273 A | 12/1974 | Bahr et al. | |
| 4,271,675 A | 6/1981 | Jones et al. | |
| 5,899,074 A | 5/1999 | Komatsu et al. | |
| 6,076,356 A | 6/2000 | Pelletier | |
| 6,101,814 A | 8/2000 | Hoke et al. | |
| 6,381,964 B1 * | 5/2002 | Pritchard et al. | ............... 60/746 |
| 6,453,660 B1 * | 9/2002 | Johnson et al. | ............ 60/39.821 |
| 6,523,350 B1 | 2/2003 | Mancini et al. | |
| 2005/0039456 A1 * | 2/2005 | Hayashi | ......................... 60/737 |

FOREIGN PATENT DOCUMENTS

| | | |
|---|---|---|
| EP | 0 660 038 A2 | 6/1995 |
| EP | 1 186 832 A2 | 3/2002 |
| EP | 1 199 522 A2 | 4/2002 |
| EP | 1 369 644 A1 | 12/2003 |
| EP | 1 471 308 A1 | 10/2004 |
| FR | 2 406 726 A1 | 5/1979 |
| GB | 2 404 976 A | 2/2005 |
| JP | A 05-087340 | 4/1993 |
| JP | A 2002-115847 | 4/2002 |
| JP | A 2002-139221 | 5/2002 |
| JP | A 2002-168449 | 6/2002 |
| JP | A 2003-004232 | 1/2003 |
| WO | WO 01/51787 A1 | 7/2001 |
| WO | WO 03/091557 A2 | 11/2003 |

OTHER PUBLICATIONS

European Search Report for European Application No. EP 06 12 5952, dated Oct. 27, 2009.

* cited by examiner

*Primary Examiner* — William H Rodríguez
*Assistant Examiner* — Craig Kim
(74) *Attorney, Agent, or Firm* — Oliff & Berridge, PLC

(57) ABSTRACT

A fuel spraying apparatus of a gas turbine engine includes a first fuel spraying section configured to spray fuel for diffusion combustion and a second fuel spraying section configured to spray fuel for premixed combustion. The second fuel spraying section is disposed so as to surround the first fuel spraying section. The apparatus further includes an air curtain generating section disposed between the first fuel spraying section and the second fuel spraying section. The air curtain generating section is configured to generate an air curtain which defines an outer edge of a diffusion combustion area in a combustion chamber.

13 Claims, 12 Drawing Sheets

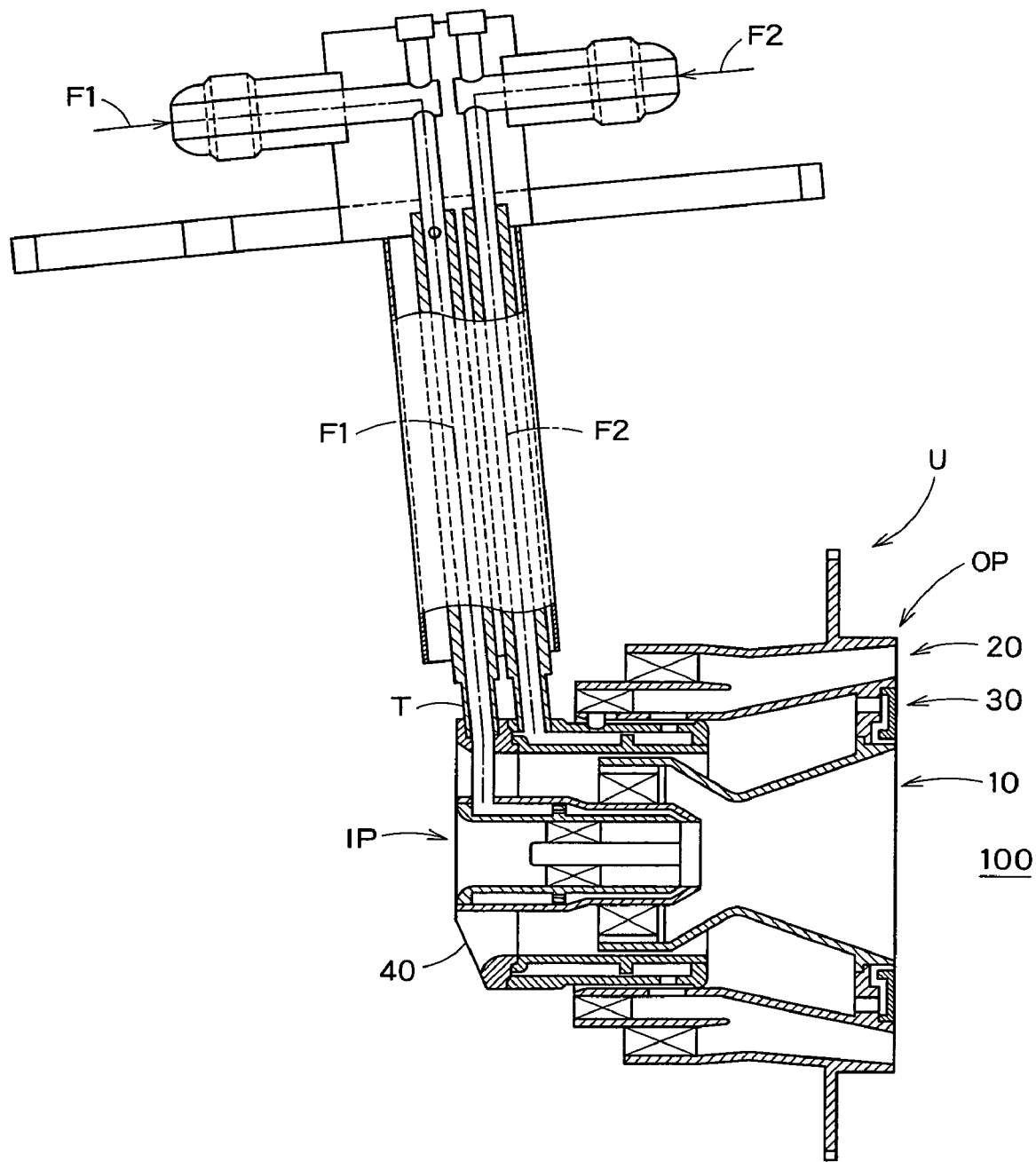
F I G. 1

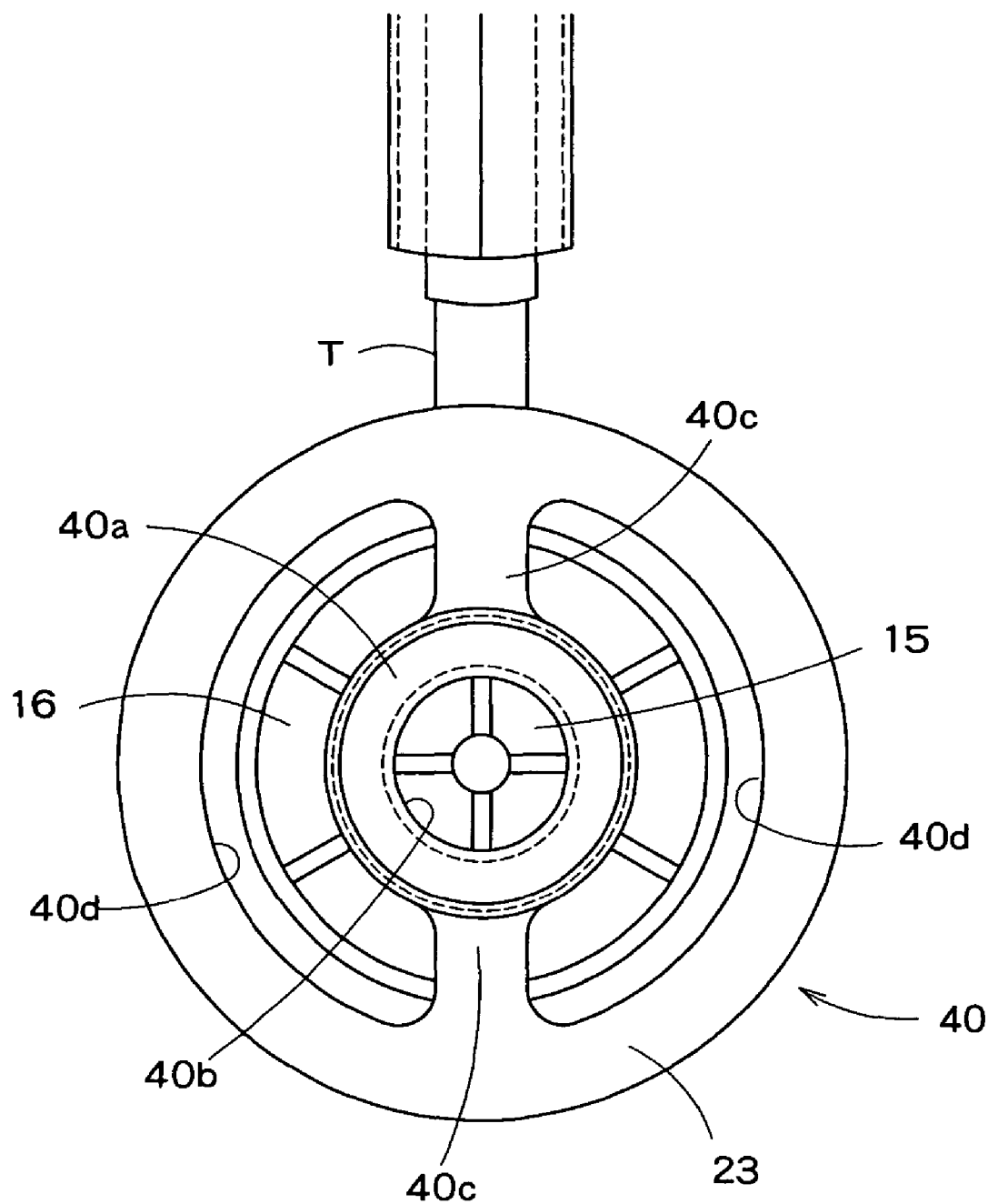
F I G. 4

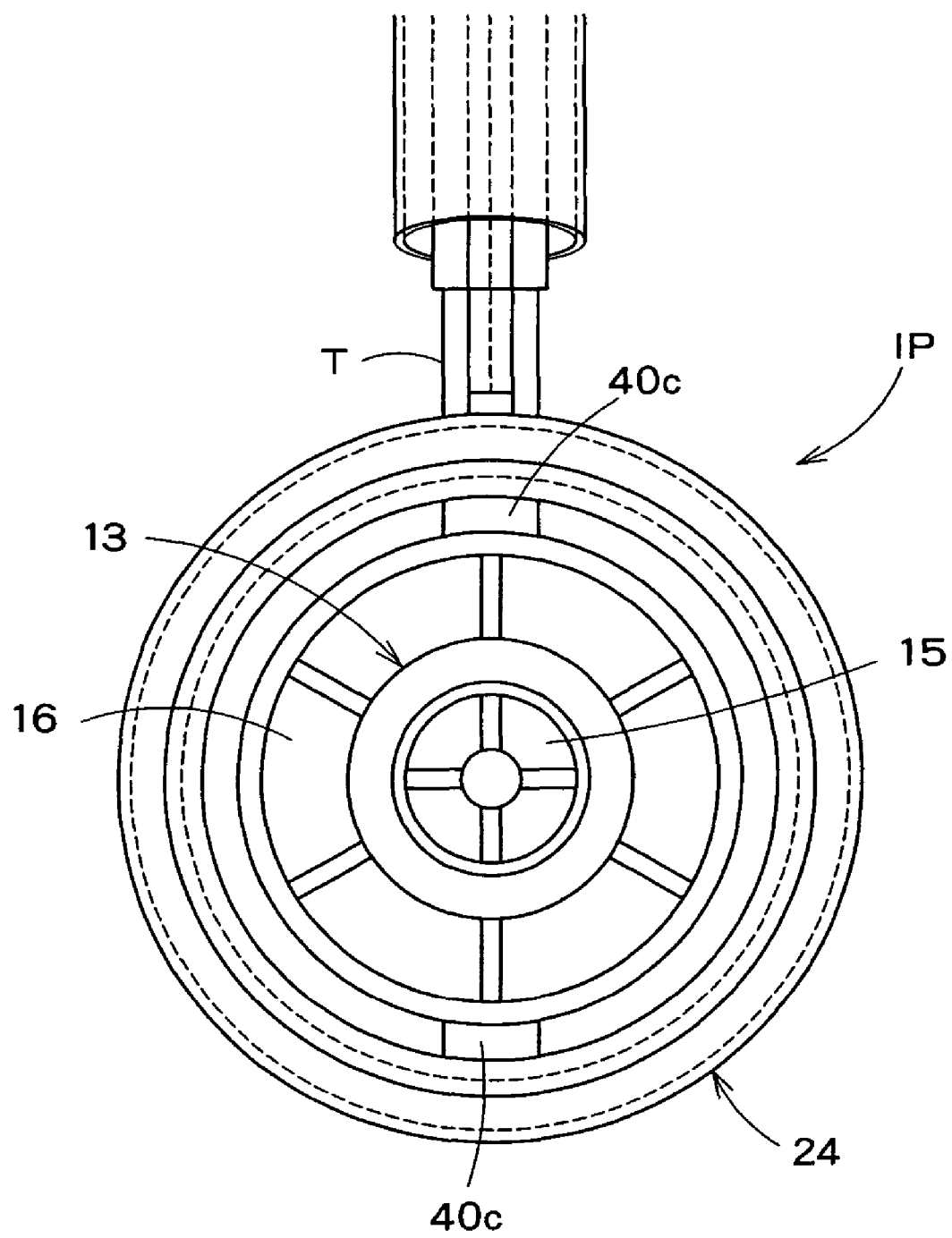
F I G. 6

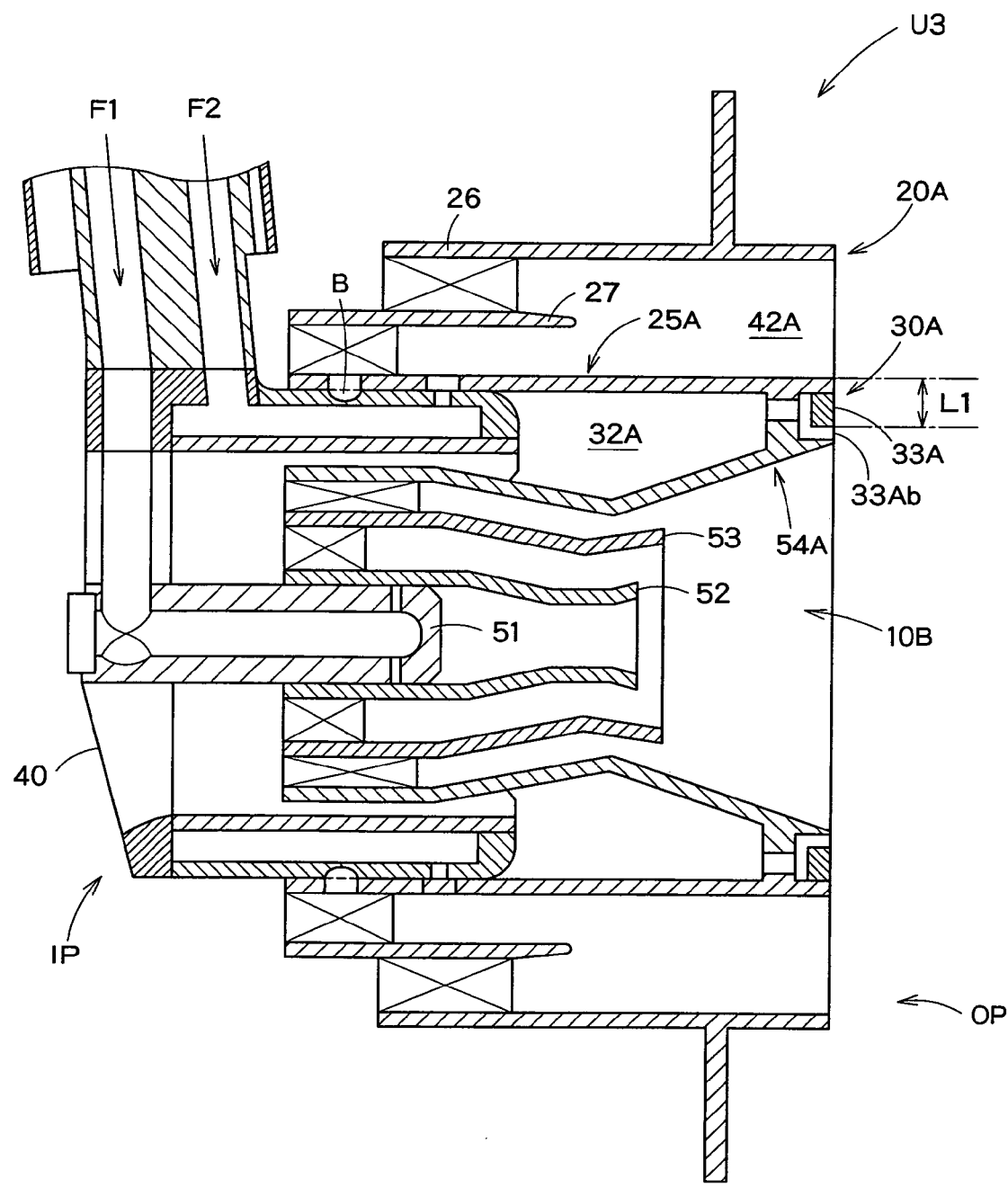
F I G. 9

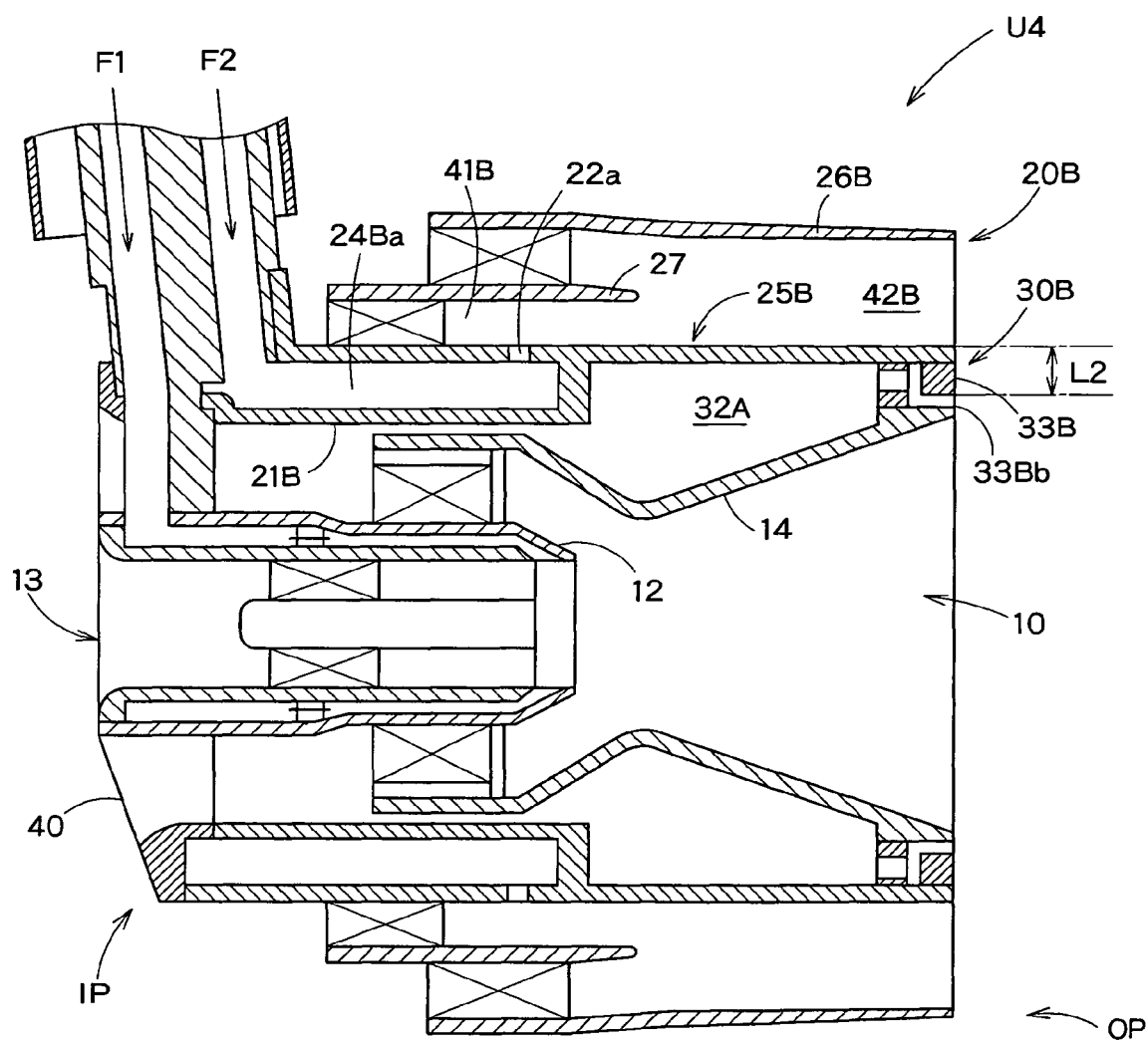
F I G. 10

FUEL SPRAYING APPARATUS OF GAS TURBINE ENGINE

CROSS-REFERENCE TO RELATED APPLICATIONS

This application is based upon the prior Japanese Patent Application No. 2005-358357 filed on Dec. 13, 2005, the entire contents of which are incorporated herein by reference.

BACKGROUND OF THE INVENTION

1. Field of the Invention

The present invention relates to a fuel spraying apparatus of a gas turbine engine and more particularly to a fuel spraying apparatus of a gas turbine engine for realizing stabler combustion in composite combustion combining two kinds of combustion systems of a diffusion combustion system and a lean combustion system.

2. Description of the Related Art

It is an urgent necessity for environmental conservation to reduce harmful material ejected by combustion of an internal combustion engine. However, in a gas turbine engine, particularly in a large engine or an airplane engine, the pressure ratio is apt to increase on demand of realization of high output, and in correspondence to it, realization of high temperature and high pressure at the entrance of a combustor is promoted. As a result, an increase in the generation amount of NOx (nitrogen oxide), which is one of the harmful material aforementioned, is caused.

Therefore, in order to reduce the generation amount of NOx in the gas turbine engine, combustion systems such as the lean combustion system and rich burn quick quench lean burn (RQL) system are proposed and gas turbine engines using these combustion systems are partially put into practical use.

However, the aforementioned lean combustion system to realize low NOx is deficient in combustion stability at a low load. In order to overcome this problem, a composite combustion system combining two kinds of combustion systems of the diffusion combustion system and lean combustion system is proposed (refer to Patent Documents 1, 2, 3, 4, and 5 listed below).

Namely, the lean combustion system is required to introduce a large amount of air from the fuel spraying apparatus, so that the local fuel density in the combustion area is greatly lowered than the fuel density at the diffusion combustion system, and a problem arises that the ignitableness and combustibleness at a low load are degraded. Therefore, the composite combustion system intended to overcome the aforementioned problem by combination of the diffusion combustion system and lean combustion system, which is excellent in combustion stability, attracts a great deal of attention.

However, in the composite combustion system, a large amount of air introduced for lean combustion adversely affects combustion by the diffusion combustion system. Due to this adverse effect, a problem arises in combustion by the diffusion combustion system that sufficient ignitableness and flamableness and the combustion stability at a low load may not be obtained.

Particularly, for an airplane gas turbine, sure ignition is required under the condition of low temperature and low pressure at a high altitude, and emission at a low load at time of idling is regulated in various aspects, so that the degradation in the ignitableness and combustion stability due to air introduced for lean combustion may come into a greater problem.

Patent Document 1: Japanese Patent Laid-Open Publication No. 5-87340
Patent Document 2: Japanese Patent Laid-Open Publication No. 2002-115847
Patent Document 3: Japanese Patent Laid-Open Publication No. 2002-139221
Patent Document 4: Japanese Patent Laid-Open Publication No. 2002-168449
Patent Document 5: Japanese Patent Laid-Open Publication No. 2003-4232

SUMMARY OF THE INVENTION

The present invention was developed with the foregoing problems of the art relating to the present invention in view and is intended to provide a fuel spraying apparatus of a gas turbine engine for improving ignitableness, flamableness, and particularly combustion stability at a low load in a combustor to which the composite combustion system combining two kinds of combustion systems of the diffusion combustion system and lean combustion system is applied.

The present invention is a fuel spraying apparatus of a gas turbine engine, including: a first fuel spraying section configured to spray fuel for diffusion combustion; a second fuel spraying section configured to spray fuel for premixed combustion, the second fuel spraying section being disposed so as to surround the first fuel spraying section; and an air curtain generating section disposed between the first fuel spraying section and the second fuel spraying section, the air curtain generating section being configured to generate an air curtain which defines an outer edge of a diffusion combustion area in a combustion chamber.

In the fuel spraying apparatus of a gas turbine engine, preferably, the first fuel spraying section includes a cylindrical main unit having a double-wall structure configured to spray fuel for diffusion combustion, an inner swirler arranged in the cylindrical main unit, a spraying nozzle member configured to define a spray angle of fuel from the cylindrical main unit, and an outer swirler arranged between the cylindrical main unit and the spraying nozzle member.

In the fuel spraying apparatus of a gas turbine engine, preferably, the first fuel spraying section includes a closed-end cylindrical main unit configured to spray fuel for diffusion combustion, a nozzle-shaped cylindrical inner peripheral wall into which the closed-end cylindrical main unit is fitted, the nozzle-shaped cylindrical inner peripheral wall being widened toward its distal end, a nozzle-shaped cylindrical intermediate wall arranged outside the cylindrical inner peripheral wall, the nozzle-shaped cylindrical intermediate wall being widened toward its distal end, a spraying nozzle member arranged outside the cylindrical intermediate wall, the spraying nozzle member being widened toward its distal end, an inner swirler arranged between the cylindrical inner peripheral wall and the cylindrical intermediate wall, and an outer swirler arranged between the cylindrical intermediate wall and the spraying nozzle member.

In the fuel spraying apparatus of a gas turbine engine, preferably, the inner swirler and the outer swirler are configured such that an influence of the inner swirler is lower than an influence of the outer swirler.

In the fuel spraying apparatus of a gas turbine engine, preferably, an air injecting port of the air curtain generating section is disposed at an outer edge of the spraying nozzle member.

In the fuel spraying apparatus of a gas turbine engine, preferably, the second fuel spraying section includes a premixing preliminary chamber and a premixing chamber.

In the fuel spraying apparatus of a gas turbine engine, preferably, the fuel spraying sections include an inside block including a fuel injecting part and an outside block not including a fuel injecting part, the inside block and the outside block being separable from each other.

In the fuel spraying apparatus of a gas turbine engine, preferably, the fuel spraying sections includes an inside block including a fuel injecting part and an outside block not including a fuel injecting part, and the inside block and the outside block being integrally formed.

The present invention is a combustor including a fuel spraying apparatus of a gas turbine engine as defined above.

The fuel spraying apparatus of a gas turbine engine of the present invention is structured as mentioned above, so that it can produce an excellent effect of improving ignitableness, flamableness, and particularly combustion stability at a low load in a combustor to which the composite combustion system combining two kinds of combustion systems of the diffusion combustion system and lean combustion system is applied.

BRIEF DESCRIPTION OF THE DRAWINGS

The above and other objects features and advantages of the present invention will become more apparent from the following description taken in connection with the accompanying drawings, in which:

FIG. 1 is a schematic view, part of which is a sectional view, showing a fuel spraying apparatus of a gas turbine engine according to Embodiment 1 of the present invention;

FIG. 4 is a rear view showing the base of the fuel spraying apparatus;

FIG. 6 is a front view of the inside block shown in FIG. 5;

FIG. 9 is an enlarged sectional view, which corresponds to FIG. 2, of Embodiment 4 of the present invention;

FIG. 10 is an enlarged sectional view, which corresponds to FIG. 2, of Embodiment 5 of the present invention;

DESCRIPTION OF THE PREFERRED EMBODIMENTS

Hereinafter, the present invention will be explained on the basis of the embodiments with reference to the accompanying drawings, though the present invention is not limited only to those embodiments.

Embodiment 1

Figure 2:
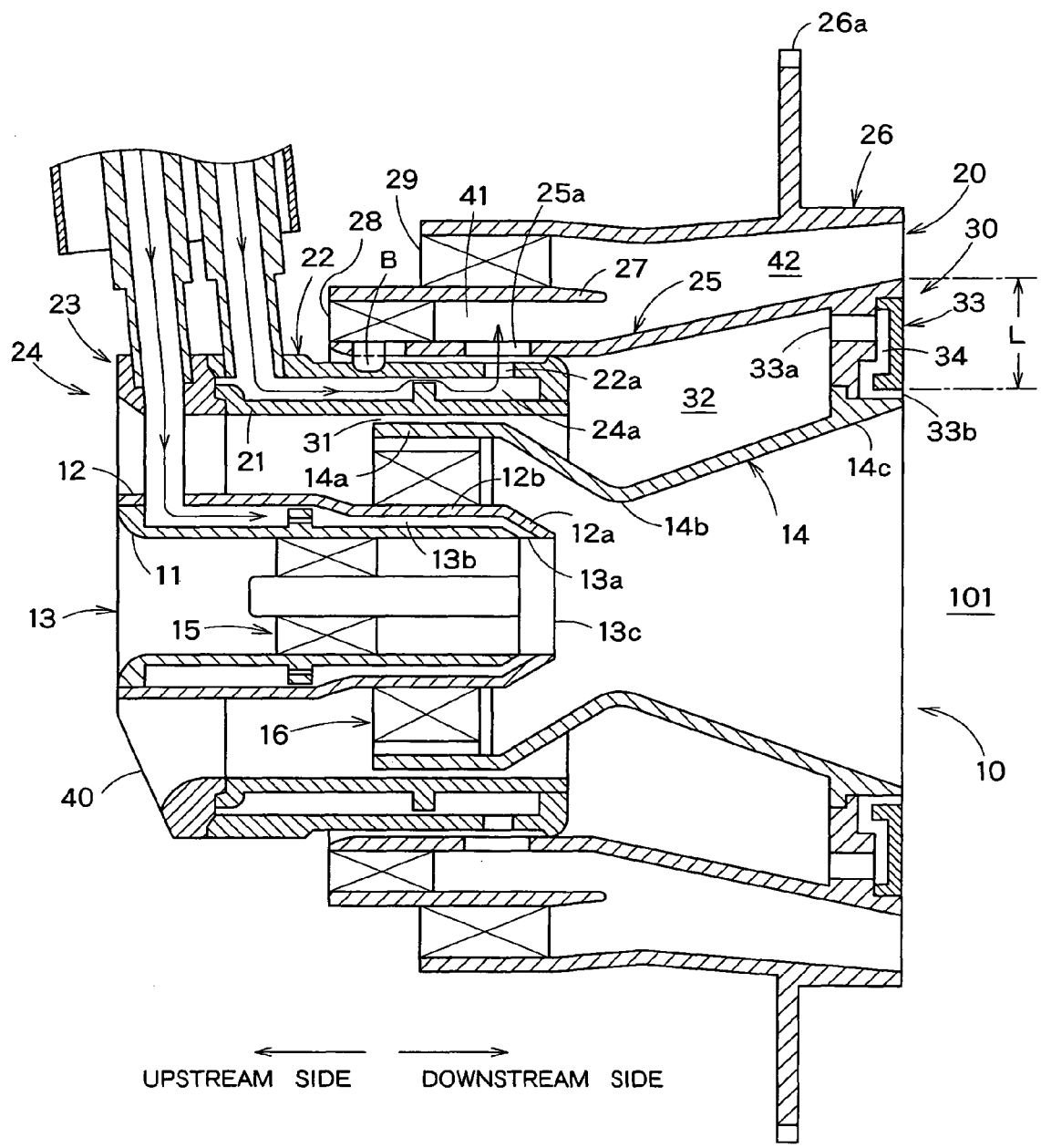
FIG. 2 is an enlarged sectional view showing the fuel spraying apparatus.
Figure 3:
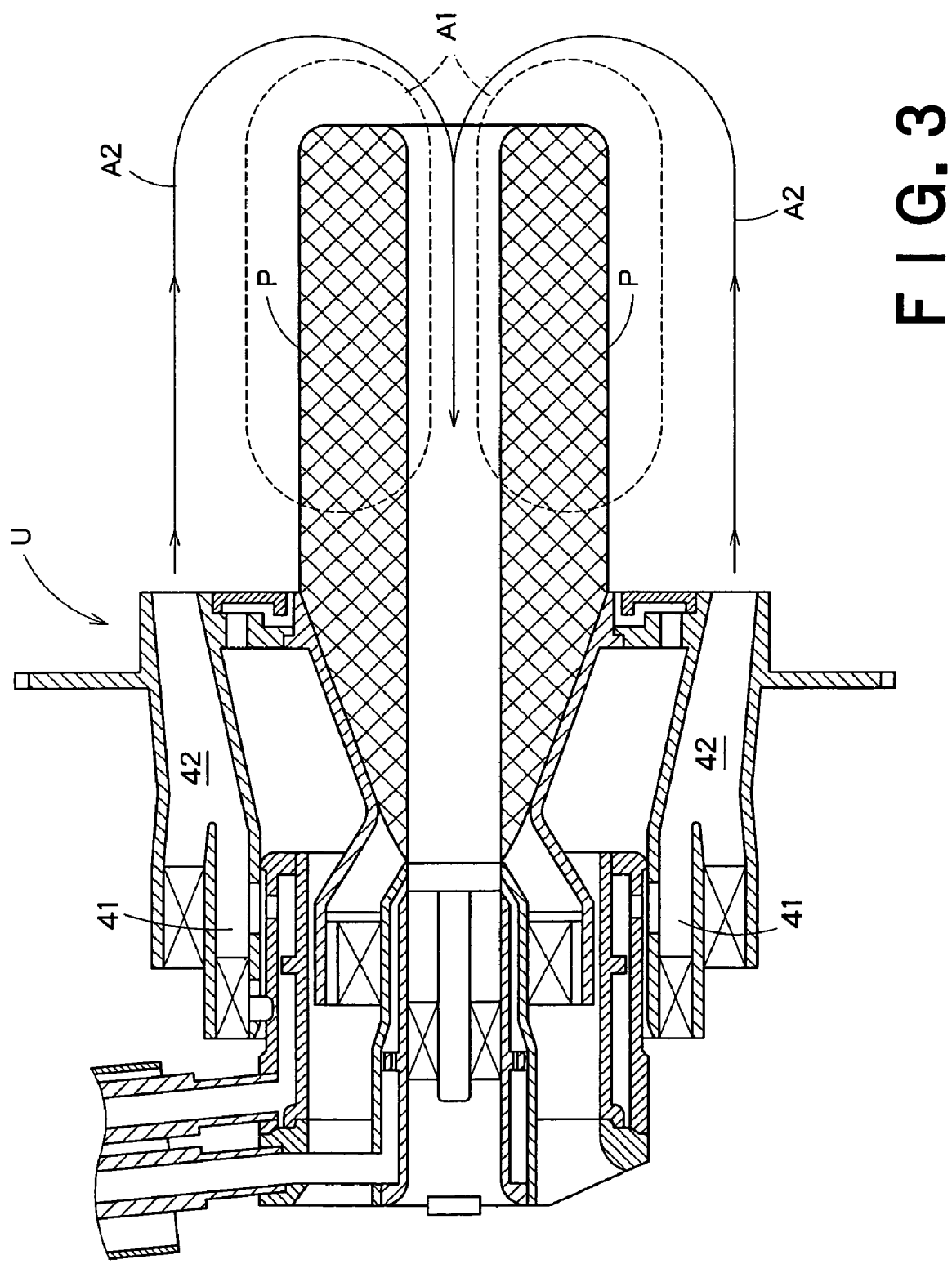
FIG. 3 is a schematic view showing the spray pattern of fuel by the fuel spraying apparatus.

Referring to FIGS. 1 to 3, a fuel spraying apparatus U is installed in a combustor 100 of a gas turbine engine. The fuel spraying apparatus U includes a first fuel spraying section 10, a second fuel spraying section 20, and an air curtain generating section 30. The first fuel spraying section 10 is configured to spray fuel for diffusion combustion from a first fuel supply system F1 toward a diffusion combustion area A1. The a second fuel spraying section 20 is installed so as to surround the first fuel spraying section 10 in the radial direction thereof. The second fuel spraying section 20 is configured to spray fuel while premixing the same for lean combustion from a second fuel supply system F2 toward a premixed combustion area A2. The air curtain generating section 30 is configured to generate an air curtain for defining the outer edge of the diffusion combustion area A1.

Here, the fuel spraying apparatus U has an almost axially symmetric structure, so that in the drawing the numerals are assigned only to the upper half thereof.

Hereinafter, the first fuel spraying section 10 will be explained.

The first fuel spraying section 10, as shown in FIG. 2, includes a main unit 13 of a cylindrical double-wall which is composed of an inside cylindrical body 11 and an outside cylindrical body 12. The main unit 13 is positioned at the central part of the first fuel spraying section 10 so as to supply diffusion combustion fuel. The first fuel spraying section 10 further includes a Venturi spraying nozzle member 14 arranged concentrically outside the main unit 13, an inner swirler 15 arranged circularly in the inside cylindrical body 11, and an outer swirler 16 arranged between the outside cylindrical body 12 and the spraying nozzle member 14. A fuel transport path 13b for transporting fuel from the first fuel supply system F1 up to an injecting port 13a installed on the end face of the main unit 13 on the downstream side is formed between the inside cylindrical body 11 and the outside cylindrical body 12. And, the first fuel spraying section 10 injects fuel transported through the fuel transport path 13b from the injecting port 13a. The injected fuel is atomized by air from the inner swirler 15 (primary atomization). The primarily atomized fuel is further reduced into finer particles by a rotating air current from the outer swirler 16 in the spraying nozzle member 14 (secondary atomization). Thereby, the fuel is sprayed into a combustion chamber 101 of the combustor 100.

Here, the main unit 13, together with a main unit 24 of the second fuel spraying section 20 which will be described later, is supported by a base 40 (refer to FIG. 4) connected to a fuel pipe T (refer to FIG. 1) of the first fuel supply system F1.

The spraying nozzle member 14 is regulated in its shape and mounting position so that fuel injected from the injecting port 13a has a predetermined spread angle. Namely, a cylindrical portion 14a is positioned outside the outside cylindrical body 12 on the downstream side of the same. A minimum inner diameter portion (contracted portion) 14b is arranged at a predetermined position downstream of the injecting port 13a. Thus the angle of an expanded diameter portion 14c, which is widened toward the end thereof, is set to a predetermined angle.

The outer swirler 16 is arranged between the cylindrical portion 14a of the spraying nozzle member 14 and the outside cylindrical body 12.

And, fuel injected from the injecting port 13a is injected obliquely in a film shape toward the central axis of the main unit 13 since a downstream portion 12a of the outside cylindrical body 12 is in a tapering truncated cone shape as shown in FIG. 2. And, the fuel injected in a film shape is atomized by air from the inner swirler 15 so as to be injected from the injecting port 13c. The injected fuel is further reduced into finer particles in the spraying nozzle member 14 by a rotating air current from the outer swirler 16 so as to be sprayed into the combustion chamber 101.

Next, the second fuel spraying section 20 will be explained.

The second fuel spraying section 20, as shown in FIG. 2, includes the main unit 24 of a cylindrical double-wall for supplying fuel for premixed combustion. The main unit 24 is composed of an inside cylindrical body 21 and an outside cylindrical body 22. The main unit 24 is positioned so that the end opening thereof on the upstream side is blocked by a cover portion 23 of a base 40 outside the spraying nozzle member 14 and is supported by the base 40. The second fuel spraying section 20 further includes a cylindrical intermediate wall 25 arranged concentrically outside the main unit 24, a cylindrical outer peripheral wall 26 arranged concentrically outside the cylindrical intermediate wall 25. A cylindrical partition wall 27 is disposed between the cylindrical intermediate wall 25 and the cylindrical outer peripheral wall 26. An inner swirler 28 is arranged in a premixing preliminary chamber 41 between the cylindrical intermediate wall 25 and the cylindrical partition wall 27. An outer swirler 29 is arranged between the cylindrical partition wall 27 and the cylindrical outer peripheral wall 26. A fuel transport path 24a for transporting fuel from the second fuel supply system F2 up to an injecting port 22a bored on the outer periphery of the outside cylindrical body 22 on the downstream side at a predetermined interval is formed between the inside cylindrical body 21 and the outside cylindrical body 22. A premixing chamber 42 is formed by the cylindrical intermediate wall 25 and cylindrical outer peripheral wall 26. Fuel transported by the fuel transport path 24a is injected from the injecting port 22a into the premixing preliminary chamber 41. The injected fuel is atomized by air from the inner swirler (primary atomization), and the atomized fuel is further reduced into finer particles by a rotating air current from the outer swirler 29, in a premixing chamber 42 (secondary atomization) so as to be premixed and sprayed into the combustion chamber 101.

Here, the inner diameter of the inside cylindrical body 21, as shown in FIG. 2, is made larger than the outside diameter of the cylindrical portion 14a of the spraying nozzle member 14. Thus, between the inside cylindrical body 21 and the cylindrical portion 14a of the spraying nozzle member 14, an air introducing path 31 of the air curtain generating section 30 is formed.

The cylindrical intermediate wall 25, as shown in FIG. 2, is positioned so as to cover almost a half of the outside cylindrical body 22 (the part on the downstream side) and the downstream end thereof coincides with the downstream end of the spraying nozzle member 14. Further, at the position of the cylindrical intermediate wall 25 corresponding to the injecting port 22a, an introduction port 25a is formed in order to introduce injected fuel into the premixing preliminary chamber 41.

Here, the cylindrical intermediate wall 25 and outside cylindrical body 22 are mutually fixed to each other, for example, by a predetermined number of pins B. When the pins B are removed, the fitting between the cylindrical intermediate wall 25 and the outside cylindrical body 22 can be released.

Further, the cylindrical intermediate wall 25 and cylindrical partition wall 27 are connected via the inner swirler 28. The cylindrical partition wall 27 and cylindrical outer peripheral wall 26 are connected via the outer swirler 29. The cylindrical intermediate wall 25 is further connected to the spraying nozzle member 14 via a cover member 33. These connected members form one block (hereinafter, referred to as an outside block) OP. The outside block OP, when the fitting between the cylindrical intermediate wall 25 and the outside cylindrical body 22 is released, can be separated from an inside block IP which will be described later.

The cylindrical partition wall 27 is regulated in its length so that the upstream end thereof coincides with the upstream end of the cylindrical intermediate wall 25 and the downstream end thereof is positioned at a predetermined distance on the downstream side from the introduction port 25a.

The cylindrical outer peripheral wall 26, which is formed to be stepwise, is disposed so that the upstream end thereof is positioned downstream of the upstream end of the cylindrical partition wall 27 by a predetermined distance. The cylindrical outer peripheral wall 26 is also positioned so that the downstream end thereof coincides with the downstream end of the cylindrical intermediate wall 25. Further, in the downstream portion of the cylindrical outer peripheral wall 26, a mounting portion 26a for mounting the fuel spraying apparatus U on the combustor 100 is formed in a flange shape.

The inner swirler 28 is installed between the upstream portions of the cylindrical intermediate wall 25 and the cylindrical partition wall 27.

The outer swirler 29 is installed between the upstream portions of the cylindrical partition wall 27 and the cylindrical outer peripheral wall 26.

And, fuel injected from the injecting port 22a and introduced from the introduction port 25a into the premixing preliminary chamber 41 is atomized by an air current from the inner swirler 28 (primary atomization). Then, the fuel is further reduced into finer particles by a rotating air current from the outer swirler 29 (secondary refinement) so as to be premixed in the premixing chamber 42 and sprayed into the combustion chamber 101.

Next, the air curtain generating section 30 will be explained.

The air curtain generating section 30, as shown in FIG. 2, includes a storage chamber 32 formed by the spraying nozzle member 14 and cylindrical intermediate wall 25. The air curtain generating section 30 further includes the ring cover member 33 for blocking the downstream ends of the spraying nozzle member 14 and cylindrical intermediate wall 25.

Here, in the cover member 33, as shown in FIG. 2, an air flow path 34 is formed so as to interconnect the inner surface of the outer peripheral part of the cover member 33 on the upstream side to the outer surface of the inner peripheral part of the same on the downstream side (the surface opposite to the combustion chamber 101). Namely, the air flow path 34 is formed so as to have an air introduction port 33a on the inner surface of the outer peripheral part of the cover member 33 on the upstream side and an air injecting port 33b on the outer surface of the inner peripheral part of the same on the downstream side. And, by the air flow path 34, the cover member 33 is cooled by air, and air curtain forming air is supplied into the combustion chamber 101.

And, air introduced from the air introducing path 31 formed between the spraying nozzle member 14 and the inside cylindrical body 21 into the storage chamber 32 is sprayed from the air injecting port 33b into the combustion chamber 101 while cooling the cover member 33 so as to form an air curtain. By the air curtain, fuel sprayed from the spraying nozzle member 14 into the diffusion combustion flow area A1 in the combustion chamber 101 is defined as a pattern P so that its spread is controlled. Thus, the fuel will not be mixed with air in the premixing area A2 (refer to FIG. 3). Further, the sprayed fuel is further reduced into finer particles by the air forming the air curtain (tertiary atomization). Therefore, stable diffusion combustion is realized. The realization of stable diffusion combustion can be made more certain when the injecting port 33b of air curtain forming air is positioned inside at a predetermined distance of L from the inside end of the premixing chamber 42.

Next, the base 40 will be explained referring to FIG. 4.

The base 40 includes an inside support section 40a which is a ring member with a small-diameter for supporting the main unit 13 of the first fuel spraying section 10. The base 40 further includes the aforementioned cover section 23 which is a ring member with a large diameter for blocking the upstream end opening of the main unit 24 of the second fuel spraying section 20 and supporting the main unit 24. At the center of the inside support section 40a, an air vent 40b for the inner swirler is formed and between the inside support section 40a and the cover section 23, air vents 40d and 40d for the outer swirler halved by connections 40c and 40c are formed.

As mentioned above, the base 40 is connected to the main unit 13 of the first fuel spraying section 10 and the main unit 24 of the second spraying section 20 so as to form one connection (hereinafter, referred to as an inside block) IP. As mentioned above, when the fitting between the cylindrical intermediate wall 25 and the outside cylindrical body 22 is released, the inside block IP and the outside block OP including no fuel injecting part can be separated from each other.

Figure 5:
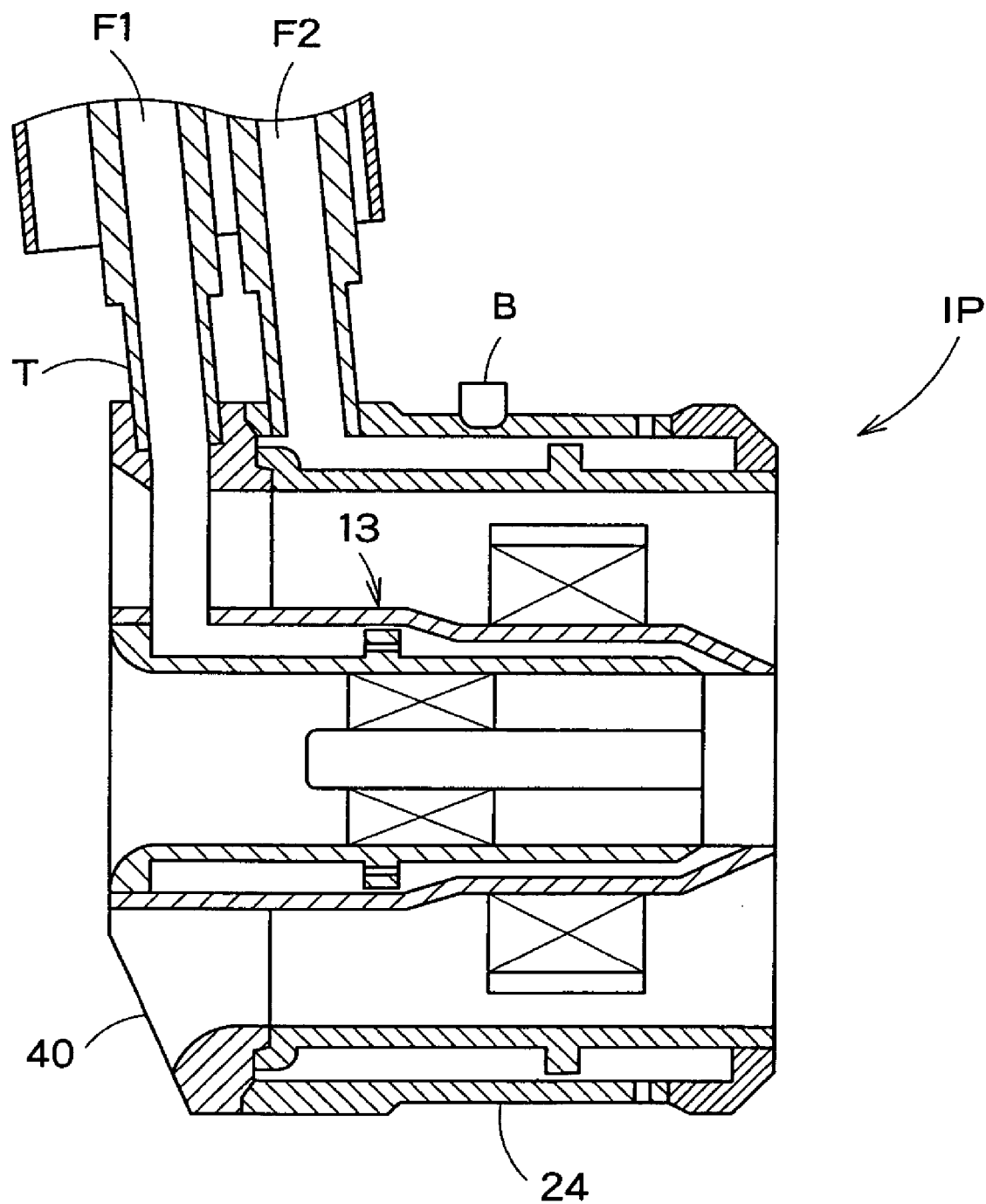
FIG. 5 is an enlarged sectional view showing an inside block of the fuel spraying apparatus separated from an outside block of the same.

Referring to FIGS. 5 and 6, by use of this constitution, it is possible to remove only the inside block IP from a combustor casing (not shown) to perform maintenance. Further, with respect to a space in the combustor casing necessary for pull-out operation, only a space for the inside block IP is needed so that the combustor casing can be lightened.

As mentioned above, according to Embodiment 1, the ignitableness, flamableness, and combustion stability at a low load in the combustor 100 to which the so-called composite combustion system combining two kinds of combustion systems of the diffusion combustion system and lean combustion system is applied can be improved. Further, the combustor 100 can be made in small size and light weight.

Embodiment 2

Figure 7:
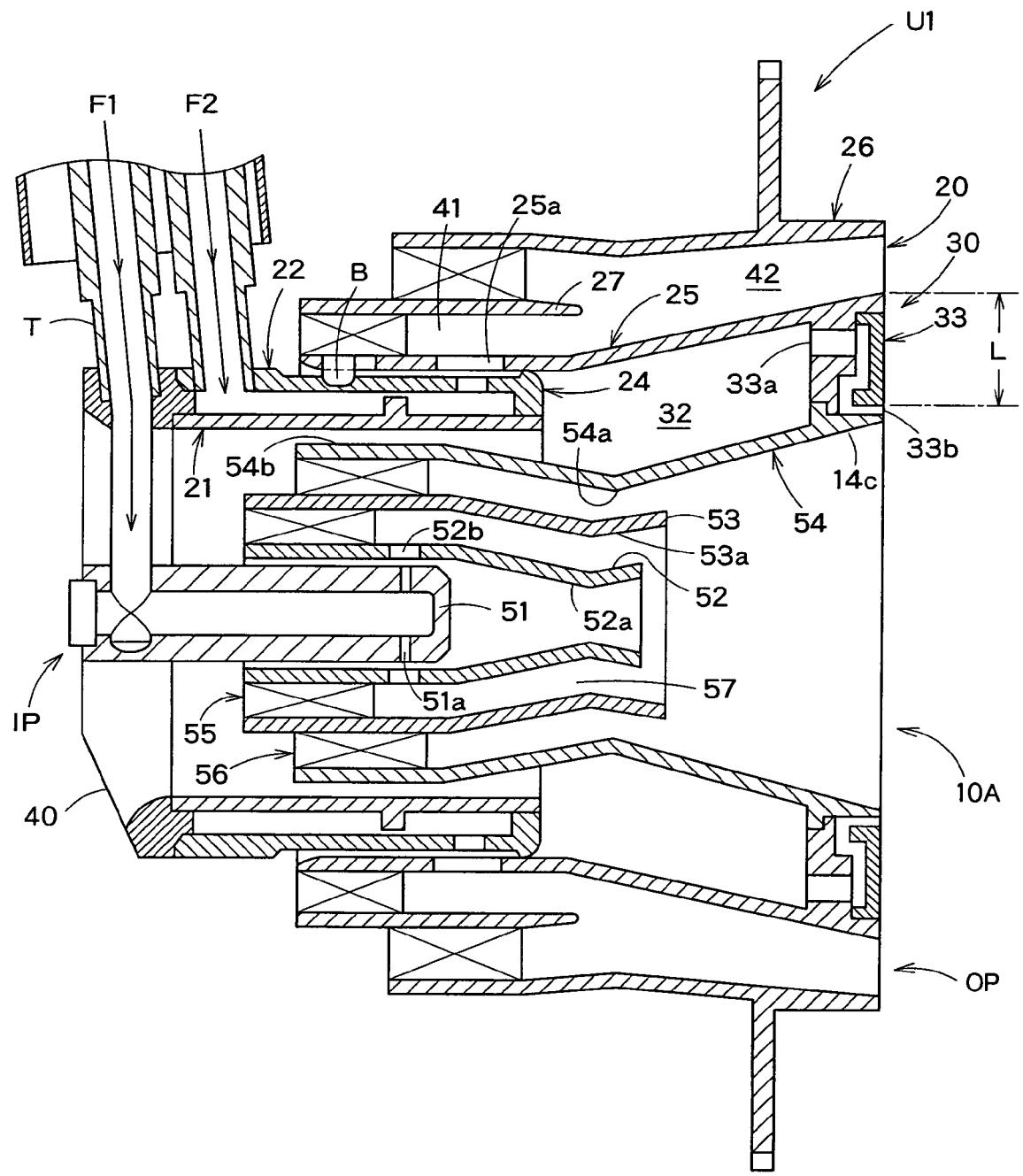
FIG. 7 is an enlarged sectional view, which corresponds to FIG. 2, of Embodiment 2 of the present invention.

FIG. 7 shows a fuel spraying apparatus U1 according to Embodiment 2 of the present invention. Embodiment 2 is made by modifying Embodiment 1, that is, the first fuel spraying section 10 of Embodiment 1 for diffusion combustion is modified. The constitution other than a first fuel spraying section 10A is the same as that of Embodiment 1, so that the same numerals are assigned and detailed explanation will be omitted.

The first fuel spraying section 10A, as shown in FIG. 7, includes a closed-end cylindrical main unit 51 for supplying fuel for diffusion combustion. A cylindrical inner peripheral wall 52 is fit into the main unit 51. A cylindrical intermediate wall 53 is arranged concentrically outside the cylindrical inner peripheral wall 52. A Venturi spraying nozzle member 54 is arranged concentrically outside the cylindrical intermediate wall 53. An inner swirler 55 is arranged between the cylindrical inner peripheral wall 52 and the cylindrical intermediate wall 53. An outer swirler 56 is arranged between the cylindrical intermediate wall 53 and the spraying nozzle member 54. At the end of the main unit 51 on the downstream side, an injecting port 51a for spraying fuel supplied from the first fuel supply system F1 into the main unit 51 is formed. And, the first fuel spraying section 10A injects fuel transported into the main unit 51 from the injecting port 51a. The injected fuel is atomized by air from the inner swirler 55 (primary atomization). The primarily atomized fuel is further reduced into finer particles by a rotating air current from the outer swirler 56 in the spraying nozzle member 54 (secondary atomization), thereby the fuel is sprayed into the combustion chamber.

Here, the main unit 51, together with the main unit 24 of the second fuel spraying section 20, is supported by the base 40. The main unit 51 of the first fuel spraying section 10A, the main unit 24 of the second fuel spraying section 20, and the base 40 form the inside block IP. Further, the cylindrical inner peripheral wall 52, cylindrical intermediate wall 53, and Venturi spraying nozzle member 54 are connected to the cylindrical intermediate wall 25 together with the cylindrical outer peripheral wall 26 so as to form the outside block OP.

As mentioned above, also in Embodiment 2, when the fitting between the cylindrical intermediate wall 25 and the outside cylindrical body 22 is released, the inside block IP and outside block OP can be separated from each other and the same operation effect as that of Embodiment 1 can be obtained.

Further, the cylindrical inner peripheral wall 52 and cylindrical intermediate wall 53, in order to prevent the flow path from sudden contraction, are formed in a nozzle shape widened toward the end having contracted portions 52a and 53a corresponding to a contracted portion 54a of the spraying nozzle member 54. And, in a portion of the cylindrical inner peripheral wall 52 corresponding to the injecting port 51a, an introduction port 52b for introducing fuel into the space formed by the cylindrical inner peripheral wall 52 and cylindrical intermediate wall 53 is installed.

The cylindrical intermediate wall 53 is regulated in its length so that the upstream end thereof, as shown in FIG. 7, coincides with the upstream end of the cylindrical inner peripheral wall 52 and the downstream end is positioned in the spraying nozzle member 54 at a predetermined distance on the downstream side from the downstream end of the cylindrical inner peripheral wall 52.

The upstream end of the spraying nozzle member 54, which is formed so as to be stepwise, is positioned downstream of the upstream end of the cylindrical intermediate wall 53 by a predetermined distance.

The inner swirler 55 is installed between the upstream portions of the cylindrical inner peripheral wall 52 and the cylindrical intermediate wall 53.

The outer swirler 56 is installed between the upstream portions of the cylindrical intermediate wall 53 and the cylindrical portion 54b of the spraying nozzle member 54.

Fuel, which is injected from the injecting port 51a and introduced into a space (primarily atomization space) 57 formed by the cylindrical inner peripheral wall 52 and cylindrical intermediate wall 53 from the introduction port 52a, is atomized by an air current from the inner swirler 55 (primary atomization). Then, the fuel is further reduced into finer particles by a rotating air current from the outer swirler 56 (secondary atomization), and is sprayed into the combustion chamber.

The following process is the same as that of Embodiment 1.

As mentioned above, according to Embodiment 2, the constitution of the first fuel spraying section 10A can be simplified, in addition to the advantageous effect that the ignitableness, flamableness, and combustion stability at a low load in the combustor to which the so-called composite combustion system combining two kinds of combustion systems of the diffusion combustion system and lean combustion system is applied can be improved.

Embodiment 3

Figure 8:
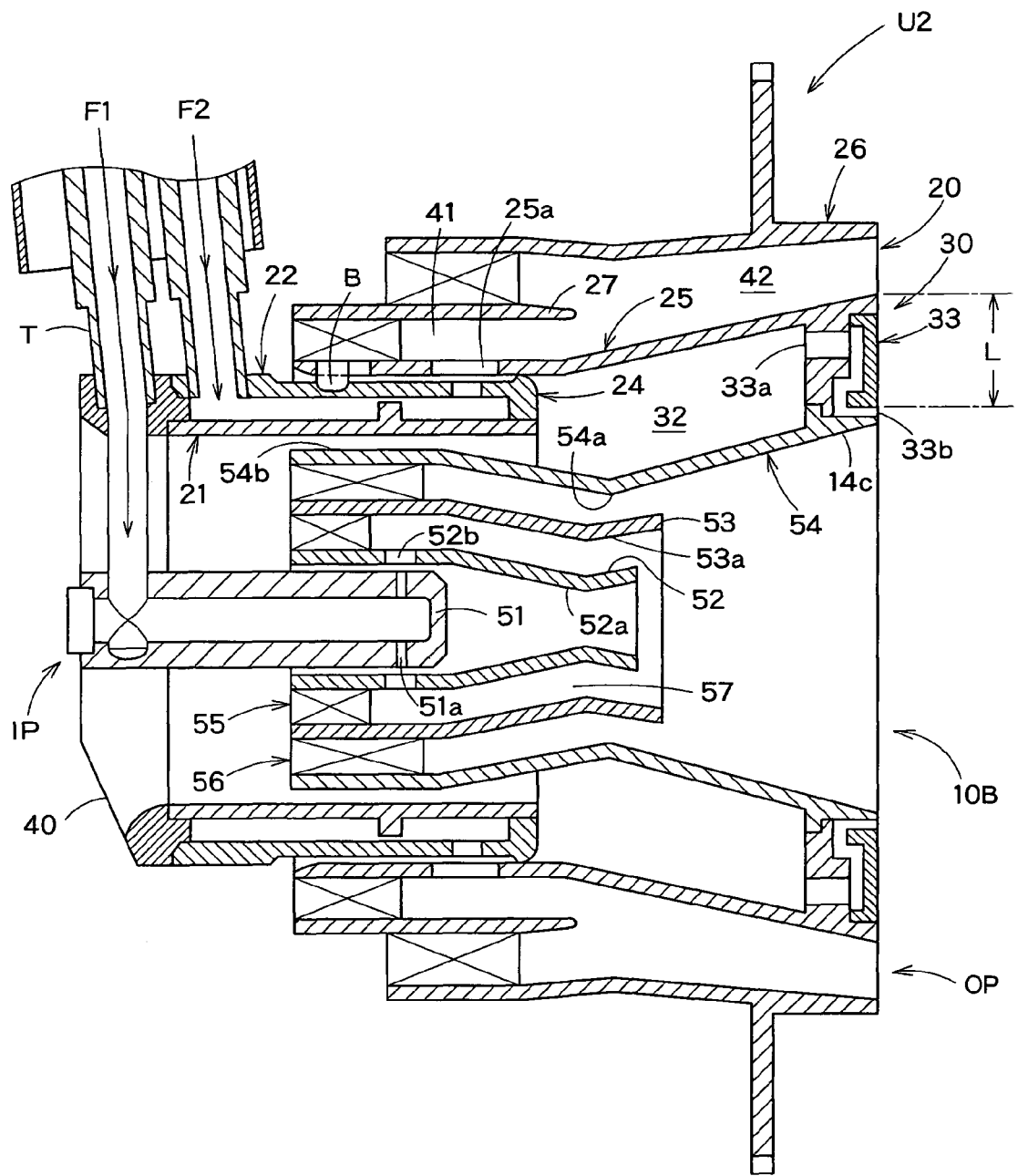
FIG. 8 is an enlarged sectional view, which corresponds to FIG. 2, of Embodiment 3 of the present invention.

FIG. 8 shows a fuel spraying apparatus U2 according to Embodiment 3 of the present invention. Embodiment 3 is made by modifying Embodiment 2, that is, the first fuel spraying section 10A for diffusion combustion of Embodiment 2 is modified. Namely, in a first fuel spraying section 10B of Embodiment 3, the upstream ends of the cylindrical inner peripheral wall 52 and cylindrical intermediate wall 53 coincide with the upstream end of the spraying nozzle member 54, and the inner swirler 55 is made smaller, thus the influence force thereof, i.e., the rotation force is lowered.

Further, the other constitution, operation, and effects are the same as those of Embodiment 2, so that detailed explanation thereof will be omitted.

As mentioned above, according to Embodiment 3, the influence of the inner swirler 55 is reduced, so that the angular control by the spraying nozzle member 54 is executed more surely, thus stabler diffusion combustion can be realized.

Embodiment 4

FIG. 9 shows a fuel spraying apparatus U3 according to Embodiment 4 of the present invention. Embodiment 4 is made by modifying Embodiment 3, that is, the second fuel spraying section 20 and air curtain generating section 30 of Embodiment 3 are modified.

Namely, in a second fuel spraying section 20A of Embodiment 4, the diameter of a cylindrical intermediate wall 25A is kept constant and the width of a premixing chamber 42A is also kept constant. Therefore, the shape of each member is simplified and the manufacture thereof can be made easy.

In an air curtain generating section 30A of Embodiment 4, due to keeping the diameter of the cylindrical intermediate wall 25A constant, the distance L1 between the inside end of the premixing chamber 42A and an injecting port 33Ab for air curtain forming air is made shorter than the distance L of Embodiment 3 and a storage chamber 32A is made smaller. Therefore, the width of the air curtain generating section 30A in the radial direction can be made smaller, thus the fuel spraying apparatus U3 can be easily made compact.

When the distance L1 is made smaller, air introduced for lean combustion is apt to influence diffusion combustion. However, even if the distance L1 is made smaller according to the requirement specification for the gas turbine, if the aforementioned influence can be suppressed sufficiently only by the air curtain of the air curtain generating section 30A, the constitution of the second fuel spraying section 20A and air curtain generating section 30A according to Embodiment 4 is desirable from the viewpoint of easiness of the manufacture and miniaturization of the apparatus.

Further, the other constitution, operation, and effects are the same as those of Embodiment 3, so that detailed explanation thereof will be omitted.

As mentioned above, according to Embodiment 4, the distance L1 between the inside end of the premixing chamber 42A and the injecting port 33Ab of air curtain forming air is made smaller, so that the fuel spraying apparatus can be made compact easily and the shape of the cylindrical intermediate wall 25A can be simplified, thus it can be designed and manufactured easily.

Embodiment 5

FIG. 10 shows a fuel spraying apparatus U4 according to Embodiment 5 of the present invention. Embodiment 5 is made by modifying Embodiment 1, that is, the second fuel spraying section 20 and air curtain generating section 30 of Embodiment 1 are modified and the outside block OP and inside block IP are united with each other.

Namely, in a second fuel spraying section 20B of Embodiment 5, a fuel transport path 24Ba is formed by an inside cylindrical body 21B and a cylindrical intermediate wall 25B which are formed integrally, and the outside cylindrical body 22 of Embodiment 1 is omitted. Therefore, fuel transported through the fuel transport path 24Ba is introduced from the injecting port 22a directly into a premixing preliminary chamber 41B. Further, similarly to Embodiment 4, the diameter of the cylindrical intermediate wall 25B is kept constant.

The outside block OP and inside block IP are united with each other, so that a cylindrical outer peripheral wall 26B is not equipped with a flange-shaped mounting portion.

Further, in the air curtain generating section 30B, due to keeping the diameter of the cylindrical intermediate wall 25B constant, the distance L2 between the inside end of a premixing chamber 42B and an injecting port 33Bb for air curtain forming air is made shorter than the distance L of Embodiment 1. The advantages and disadvantages by making the distance L2 shorter than the distance L of Embodiment 1 are the same as those of Embodiment 4.

Further, the other constitution, operation, and effects are the same as those of Embodiment 1, so that detailed explanation thereof will be omitted.

As mentioned above, according to Embodiment 5, the outside cylindrical body 22 is omitted, and the inside cylindrical body 21B and cylindrical intermediate wall 25B for forming the fuel transport path 24Ba are formed integrally, so that unlike Embodiments 1 to 4 aforementioned, the outside block OP and inside block IP cannot be separated from each other. However, by doing this, the number of parts can be reduced, so that the fuel spraying apparatus can be manufactured easily and the cost can be reduced.

Embodiment 6

Figure 11:
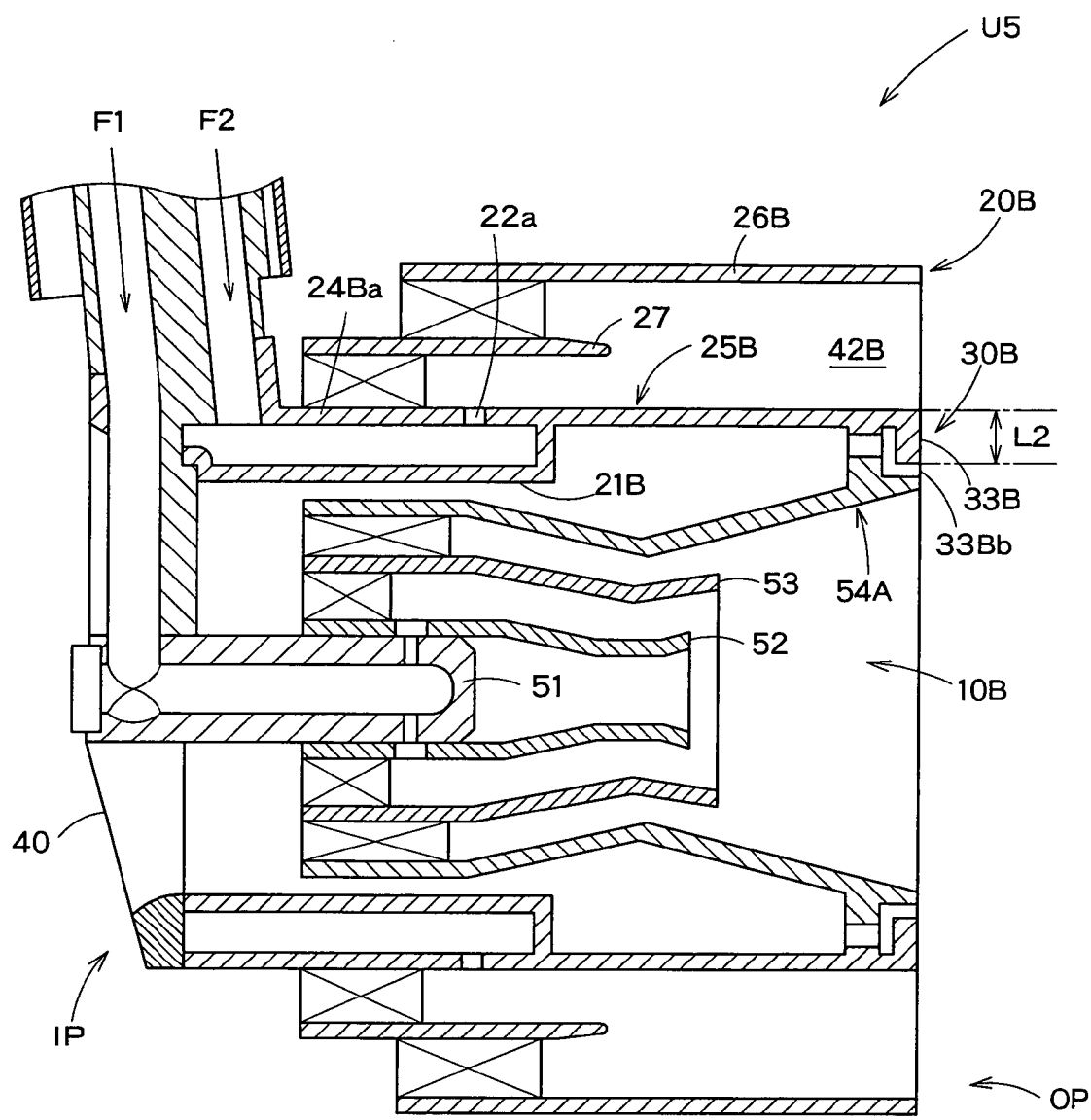
FIG. 11 is an enlarged sectional view, which corresponds to FIG. 2, of Embodiment 6 of the present invention.

FIG. 11 shows a fuel spraying apparatus U5 according to Embodiment 5 of the present invention. Embodiment 6 is made by modifying Embodiment 3, that is, the second fuel spraying section 20 and air curtain generating section 30 of Embodiment 3 are modified similarly to Embodiment 5.

Namely, in the second fuel spraying section 20B, the fuel transport path 24Ba is formed by the inside cylindrical body 21B and cylindrical intermediate wall 25B which are formed integrally, and the outside cylindrical body 22 of Embodiment 3 is omitted. Further, similarly to Embodiment 4, the diameter of the cylindrical intermediate wall 25B is kept constant.

Here, the outside block OP and inside block IP are united with each other, so that the cylindrical outer peripheral wall 26B is not equipped with a flange-shaped mounting portion.

Further, in the air curtain generating section 30B, due to keeping the diameter of the cylindrical intermediate wall 25B constant, the distance L2 between the inside end of the premixing chamber 42B and the injecting port 33Bb for air curtain forming air is made shorter than the distance L of Embodiment 3. The advantages and disadvantages by making the distance L2 shorter than the distance L of Embodiment 3 are the same as those of Embodiment 4.

Further, the other constitution, operation, and effects are the same as those of Embodiment 3, so that detailed explanation thereof will be omitted.

As mentioned above, according to Embodiment 6, similarly to Embodiment 5, the outside cylindrical body 22 is omitted, and the inside cylindrical body 21B and cylindrical intermediate wall 25B for forming the fuel transport path 24Ba are formed integrally. Thereby, unlike Embodiments 1 to 4 aforementioned, the outside block OP and inside block IP cannot be separated from each other. However, by doing this, the number of parts can be reduced, so that the fuel spraying apparatus can be manufactured easily.

Embodiment 7

Figure 12:
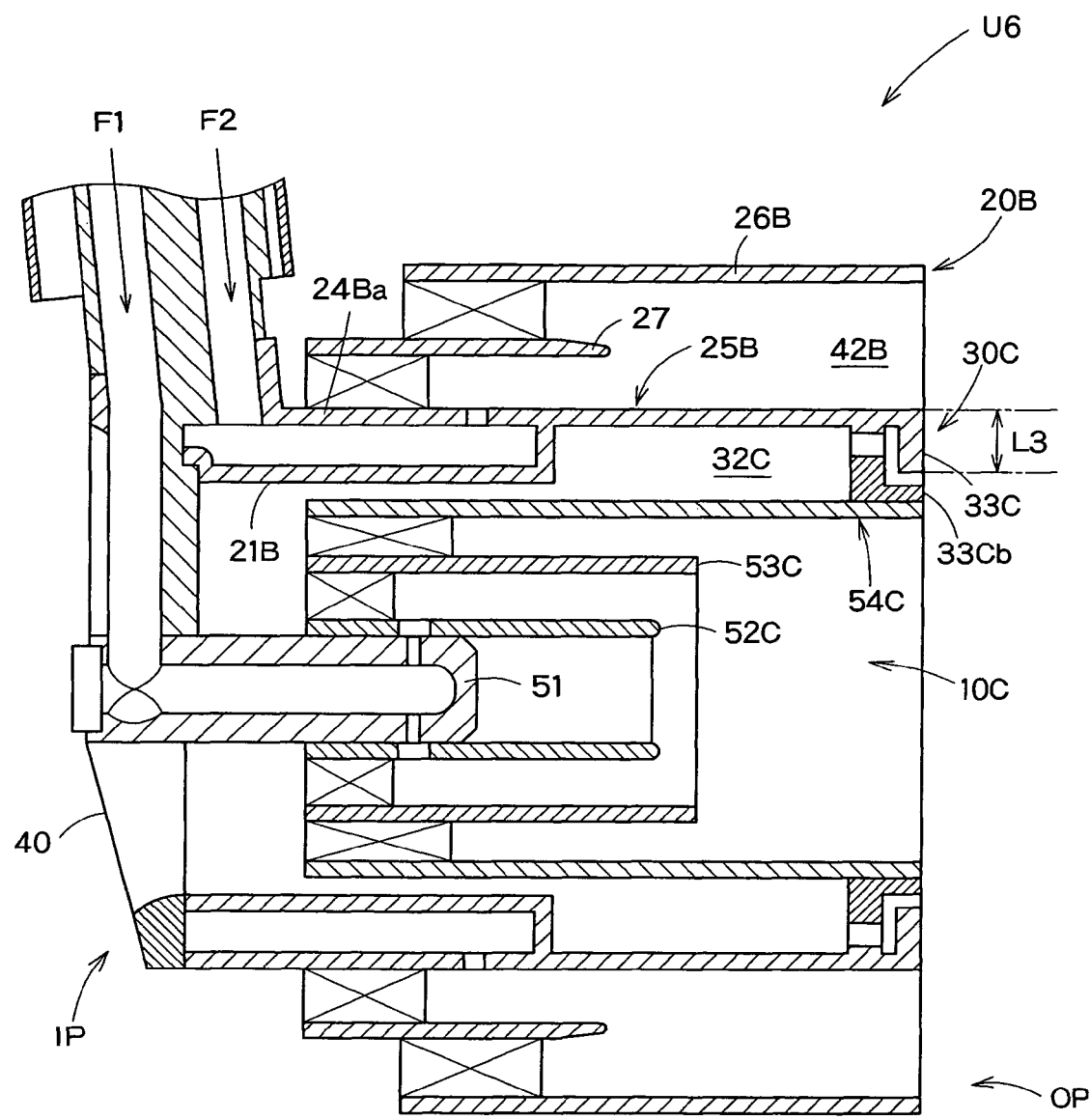
FIG. 12 is an enlarged sectional view, which corresponds to FIG. 2, of Embodiment 7 of the present invention.

FIG. 12 shows a fuel spraying apparatus U6 according to Embodiment 7 of the present invention. Embodiment 7 is made by modifying Embodiment 3 so that the outside block OP and inside block IP are united with each other.

In a first fuel spraying section 10C, a cylindrical inner peripheral wall 52C, a cylindrical intermediate wall 53C, and an injecting nozzle 54C are kept constant in diameter instead of widening toward their ends.

In the second fuel spraying section 20B, similarly to Embodiments 5 and 6, the fuel transport path 24Ba is formed by the inside cylindrical body 21B and cylindrical intermediate wall 25B which are formed integrally, and the outside cylindrical body 22 of Embodiment 3 is omitted. Further, similarly to Embodiment 4, the diameter of the cylindrical intermediate wall 25B is kept constant.

Here, the outside block OP and inside block IP are united with each other, so that the cylindrical outer peripheral wall 26B is not equipped with a flange-shaped mounting portion.

Further, in an air curtain generating section 30C, due to keeping the diameters of the injecting nozzle 54C and cylindrical intermediate wall 25B constant, the sectional shape of the storage chamber 32C in the peripheral direction is set at a simple rectangle. Further, a distance L3 between the inside end of the premixing chamber 42B and an injecting port 33Cb for air curtain forming air is made shorter than the distance L of Embodiment 3. The advantages and disadvantages by making the distance L3 shorter than the distance L of Embodiment 1 are the same as those of Embodiment 4.

Further, the other constitution, operation, and effects are the same as those of Embodiment 3, so that detailed explanation thereof will be omitted.

As mentioned above, in Embodiment 7, the cylindrical inner peripheral wall 52C, cylindrical intermediate wall 53C, and injecting nozzle 54C are kept constant in diameter instead of widening toward their ends, and the inside cylindrical body 21B and cylindrical intermediate wall 25B are formed integrally. Thereby, the shape of each part is simplified, and the parts can be manufactured easily, and the number of parts can be reduced.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A fuel spraying apparatus of a gas turbine engine, comprising:
a first fuel spraying section configured to spray fuel for diffusion combustion;
a second fuel spraying section configured to spray fuel for premixed combustion, the second fuel spraying section being disposed so as to surround the first fuel spraying section; and
air curtain generating section disposed between the first fuel spraying section and the second fuel spraying section, the air curtain generating section being configured to generate an air curtain which defines an outer edge of a diffusion combustion area in a combustion chamber,
wherein the second fuel spraying section comprises an inner swirler and an outer swirler,
wherein the second fuel spraying section comprises a premixing chamber that is formed downstream of the outer swirler, the premixing chamber being a chamber that mixes fuel and air within the second fuel spraying section, and
wherein the first fuel spraying section, the second fuel spraying section, the air curtain generating section, and the premixing chamber are all contained within a single nozzle.

2. A fuel spraying apparatus of a gas turbine engine according to claim 1, wherein the first fuel spraying section comprises a cylindrical main unit having a double-wall structure configured to spray fuel for diffusion combustion, an inner swirler arranged in the cylindrical main unit, a spraying nozzle member configured to define a spray angle of fuel from the cylindrical main unit, and an outer swirler arranged between the cylindrical main unit and the spraying nozzle member.

3. A fuel spraying apparatus of a gas turbine engine according to claim 1, wherein the first fuel spraying section comprises a closed-end cylindrical main unit configured to spray fuel for diffusion combustion, a nozzle-shaped cylindrical inner peripheral wall into which the closed-end cylindrical main unit is fitted, the nozzle-shaped cylindrical inner peripheral wall being widened toward its distal end, a nozzle-shaped cylindrical intermediate wall arranged outside the cylindrical inner peripheral wall, the nozzle-shaped cylindrical intermediate wall being widened toward its distal end, a spraying nozzle member arranged outside the cylindrical intermediate wall, the spraying nozzle member being widened toward its distal end, an inner swirler arranged between the cylindrical intermediate wall and the spraying nozzle member.

4. A fuel spraying apparatus of a gas turbine engine according to claim 3, wherein the inner swirler and the outer swirler are configured such that an influence of the inner swirler is lower than an influence of the outer swirler.

5. A fuel spraying apparatus of a gas turbine engine according to claim 2, wherein an air injecting port of the air curtain generating section is disposed at an outer edge of the spraying nozzle member.

6. A fuel spraying apparatus of a gas turbine engine according to claim 1, the fuel spraying sections comprise an inside block including a fuel injecting part and an outside block not including a fuel injecting part, the inside block and the outside block being separable from each other.

7. A fuel spraying apparatus of a gas turbine engine according to claim 1, wherein the fuel spraying sections comprise an inside block including a fuel injecting part and an outside block not including a fuel injecting part, and the inside block and the outside block being integrally formed.

8. A combustor comprising a fuel spraying apparatus of a gas turbine engine as defined in claim 1.

9. The fuel spraying apparatus according to claim 1, wherein the premixing chamber is formed directly between a wall of the second fuel spraying section and an outer wall of the apparatus.

10. The fuel spraying apparatus according to claim 1, wherein the second fuel spraying section further comprises a premixing preliminary chamber formed downstream of the inner swirler.

11. A fuel spraying apparatus of a gas turbine engine, comprising:
a first fuel spraying section configured to spray fuel for diffusion combustion; a second fuel spraying section configured to spray fuel for premixed combustion, the second fuel spraying section being disposed so as to surround the first fuel spraying section; and air curtain generating section disposed directly between the first fuel spraying section and the second fuel spraying section, the air curtain generating section being configured to generate an air curtain that defines an outer edge of a diffusion combustion area in a combustion chamber, wherein the air curtain generating section comprises an open chamber formed by a wall of the first fuel spraying section and a wall of the second fuel spraying section, wherein the second fuel spraying section comprises an inner swirler and an outer swirler, wherein the second fuel spraying section comprises a premixing preliminary chamber that is formed downstream of the inner swirler, and wherein the first fuel spraying section, the second fuel spraying section, the air curtain generating section, and the premixing chamber are all contained within a single nozzle.

12. The fuel spraying apparatus according to claim 11, wherein the premixing chamber is formed directly between the wall of the second fuel spraying section and an outer wall of the apparatus and the premixing chamber mixes fuel and air within the second fuel spraying section.

13. The fuel spraying apparatus according to claim 11, wherein the second fuel spraying section further comprises a premixing preliminary chamber formed downstream of the inner swirler.

* * * * *